(12) United States Patent
Shafer

(10) Patent No.: US 12,422,075 B1
(45) Date of Patent: *Sep. 23, 2025

(54) SECURE COUPLING FOR IRRIGATION CONDUIT AND RELATED METHODS

(71) Applicant: Daniel Shafer, Springville, CA (US)

(72) Inventor: Daniel Shafer, Springville, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/215,141

(22) Filed: Jun. 27, 2023

Related U.S. Application Data

(63) Continuation of application No. 16/243,102, filed on Jan. 9, 2019, now Pat. No. 11,686,414.

(60) Provisional application No. 62/776,380, filed on Dec. 6, 2018, provisional application No. 62/731,232, filed on Sep. 14, 2018.

(51) Int. Cl.
*F16L 37/252* (2006.01)
*F16L 37/244* (2006.01)
*F16L 41/08* (2006.01)

(52) U.S. Cl.
CPC ........... *F16L 37/252* (2013.01); *F16L 37/244* (2013.01); *F16L 41/08* (2013.01)

(58) Field of Classification Search
CPC ..... F16L 37/252; F16L 27/023; F16L 27/125; F16L 37/10; F16L 37/103; F16L 37/107; F16L 37/113; F16L 37/242; F16L 37/24; F16L 37/248; F16L 37/26; F16L 41/021; F16L 37/244
USPC ........... 285/376, 5, 6, 133.11, 133.21, 133.3, 285/307, 360, 396, 401, 402
See application file for complete search history.

(56) References Cited

U.S. PATENT DOCUMENTS

| | | | |
|---|---|---|---|
| 348,059 A | 8/1886 | Schroder | |
| 943,900 A | 12/1909 | Smith | |
| 1,042,684 A * | 10/1912 | Judkins | F16L 37/252 |
| | | | 285/360 |
| 1,274,406 A * | 8/1918 | Hansen | F16L 37/252 |
| 1,525,794 A | 2/1925 | Blake | |
| 1,572,979 A | 2/1926 | Whybrew | |
| 2,469,538 A | 5/1949 | Young | |
| 2,627,429 A | 2/1953 | Engelman | |

(Continued)

FOREIGN PATENT DOCUMENTS

| CA | 707236 A | 4/1965 |
|---|---|---|
| CA | 2162071 A1 | 5/1996 |

(Continued)

OTHER PUBLICATIONS

FR1410519A—Machine Translation—English (Year: 1964).*

(Continued)

*Primary Examiner* — William S. Choi
(74) *Attorney, Agent, or Firm* — Sierra IP Law, PC; William K. Nelson

(57) ABSTRACT

The present invention provides improved couplings for conduit systems. A male coupling and a female coupling may be mechanically engaged by inserting the male coupling into a receiver in the female coupling until fastening structures are aligned, and then rotating one or both of the male and female couplings until the fastening structures are overlapping and in interfacial engagement. The male and female couplings provide an efficient coupling solution for end-to-end conduit connection and also addresses a leakage problem in conventional irrigation pipe couplers.

4 Claims, 13 Drawing Sheets

(56) References Cited

U.S. PATENT DOCUMENTS

| | | | |
|---|---|---|---|
| 2,746,772 | A | 5/1956 | Race |
| 2,874,979 | A | 2/1959 | Shohan |
| 2,921,801 | A | 1/1960 | Beyer |
| 2,922,667 | A | 1/1960 | Claude, Jr. |
| 3,162,469 | A | 12/1964 | Shohan |
| 3,331,620 | A | 7/1967 | Rickard |
| 3,362,730 | A | 1/1968 | St. Clair et al. |
| 3,386,755 | A | 6/1968 | Miller |
| 3,425,632 | A | 2/1969 | Stout |
| 3,471,173 | A | 10/1969 | Rickard |
| 3,485,515 | A | 12/1969 | Frishof |
| 3,527,485 | A | 9/1970 | Goward |
| 3,539,206 | A | 11/1970 | Gheen et al. |
| 3,642,306 | A | 2/1972 | Gheen |
| 3,664,688 | A | 5/1972 | De Loach |
| 3,734,545 | A | 5/1973 | Stout |
| 3,735,928 | A | 5/1973 | Ballard et al. |
| 3,866,951 | A | 2/1975 | Deloach |
| 4,135,738 | A | 1/1979 | Clements |
| 4,193,616 | A | 3/1980 | Sarson et al. |
| 4,488,572 | A | 12/1984 | Brown |
| 4,688,833 | A | 8/1987 | Todd |
| 4,722,555 | A | 2/1988 | Soultatis |
| 4,850,620 | A | 7/1989 | Puls |
| 4,893,848 | A | 1/1990 | Melcher |
| 5,451,031 | A | 9/1995 | Purvis et al. |
| 5,509,699 | A | 4/1996 | Himmelberger |
| 5,511,574 | A | 4/1996 | Macke |
| 5,511,826 | A | 4/1996 | Clare et al. |
| 5,603,508 | A | 2/1997 | Dole et al. |
| 6,231,085 | B1 | 5/2001 | Olson |
| 6,302,445 | B1 * | 10/2001 | Kugele |
| 6,312,025 | B1 | 11/2001 | Wolfsdorf |
| 6,343,813 | B1 | 2/2002 | Olson |
| 6,352,288 | B1 | 3/2002 | Calkins |
| 6,561,731 | B1 | 5/2003 | Clare et al. |
| 6,672,628 | B2 | 1/2004 | Thomas et al. |
| 7,108,295 | B1 | 9/2006 | Zarynow |
| 7,530,606 | B1 | 5/2009 | Yang |
| D615,165 | S | 5/2010 | McAlpine et al. |
| 7,896,406 | B2 | 3/2011 | Suda et al. |
| 8,398,122 | B2 | 3/2013 | Crompton et al. |
| 8,459,698 | B2 | 6/2013 | Magargal et al. |
| 9,039,047 | B2 | 5/2015 | Imai |
| 9,074,714 | B2 | 7/2015 | Clare |
| D743,446 | S | 11/2015 | Jones |
| D744,812 | S | 12/2015 | Wilson |
| 9,765,913 | B2 | 9/2017 | Magargal |
| 11,686,414 | B2 | 6/2023 | Shafer |
| 2003/0129043 | A1 | 7/2003 | Clare et al. |
| 2008/0079258 | A1 | 4/2008 | Siegel et al. |
| 2010/0072744 | A1 | 3/2010 | Xie |
| 2010/0171302 | A1 | 7/2010 | Yoder |
| 2012/0161433 | A1 | 6/2012 | Magargal et al. |
| 2012/0267214 | A1 * | 10/2012 | Gabriel ................ 285/376 |
| 2016/0161038 | A1 | 6/2016 | Crompton et al. |
| 2018/0003325 | A1 | 1/2018 | Magargal et al. |
| 2018/0306359 | A1 * | 10/2018 | Yashin |
| 2020/0088335 | A1 | 3/2020 | Shafer |
| 2020/0224809 | A1 | 7/2020 | Lake |

FOREIGN PATENT DOCUMENTS

| | | |
|---|---|---|
| CA | 2566697 C | 12/2005 |
| CN | 103829883 A | 6/2014 |
| DE | 380607 C | 9/1923 |
| DE | 2102462 A1 | 5/1972 |
| EP | 0061531 A1 | 12/1981 |
| EP | 0154111 A2 | 9/1985 |
| FR | 1410519 A * | 9/1964 |
| GB | 1447183 A | 8/1976 |
| WO | 9533948 A1 | 12/1995 |

OTHER PUBLICATIONS

Martin, D.L., Design and operation of sprinkler systems, Research Gate Publication, Jan. 2007; available at https://www.researchgate.net/publication/43265028.

North American Specialty Products, Certa-Set Product Brochure, 2014.

North American Specialty Products, Certa-Set® Mechanized Solid Set Irrigation Brochure, 2018.

English Abstract of CN103829883A retrieved on Feb. 6, 2019 from: https://worldwide.espacenet.com/publicationDetails/originalDocument?CC=CN&NR=103829883A&KC=A&FT=D&ND=&date=20140604&DB=&locale=.

English Translation of Abstract for DE380607C retrieved on Feb. 6, 2019 from: https://patents.google.com/patent/DE380607C/en?oq=DE380607C.

Aluminum Dragline Pipe PDF, Rain for rent, retrieved from Internet Jan. 31, 21; PDF dated Sep. 2018; https://www.rainforrent.com/equipment/aluminum-dragline-pipe/.

English language abstract of foreign patent document DE2102462A2, downloaded Jun. 25, 2025, available on-line at https://patents.google.com/patent/DE2102462A1/en?oq=DE2102462A1.

English language abstract of foreign patent document EP0154111A2, downloaded Jun. 25, 2025, available on-line at https://patents.google.com/patent/EP0154111A2/en?oq=EP0154111A2.

* cited by examiner

SECURE COUPLING FOR IRRIGATION CONDUIT AND RELATED METHODS

FIELD OF THE INVENTION

The present invention relates to improved coupling devices for irrigation pipes and related methods. More specifically, the present invention relates to an interlocking coupling system that prevents the leakage of irrigation water at the coupling.

DISCUSSION OF THE BACKGROUND

Sprinkler-based crop irrigation is a popular irrigation method because it minimizes erosion, reduces drainage problems, and doesn't require leveling of the crop field. Such sprinkler systems differ in their degree of their portability. There are permanent systems, fully portable systems, and semi-portable systems where the piping is movable but the pumping system is fixed. Many such sprinkler systems are based on portable pipes connected by coupling devices. Such systems are well adapted for the irrigation of large agricultural operations with many acres or for small plot irrigation. Such systems provide a semi-permanent irrigation infrastructure that reduces installation and maintenance labor costs.

The coupling devices allow for a string of pipe sections to be releasibly joined in an end to end fashion. The coupling devices are typically used to connect sections of pipe that are about 20 to 40 feet long. The couplings may be bolted or welded to end of a pipe section. These couplings are normally fabricated from cast aluminum or galvanized steel. However, they can be made from polymer materials (e.g., polyvinyl chloride) and implemented in a plastic piping system. These systems can be installed and moved by a few workers. Also, the pipe sections connected together by the couplings can be dragged as a single unit (sometimes referred to as a drag line), allowing them to be moved from one location to another by towing or dragging the line behind a tractor. In order to facilitate this dragging movement, the drag line may be provided with ground skids or sleds which extend beneath the couplings and slide along the ground when the line is towed.

Such coupling devices have evolved into several designs. Some conventional designs have a loose mechanical engagement between the male and female portions of the coupling to allow flexing at the coupler as the linked drag lines are towed along a field. For example, a "drop lock" design is commonly used in the agricultural industry. This design includes laterally positioned tabs or pegs on the male coupling that are designed to be vertically slotted into corresponding lateral slots or catch in the female coupling. While this design provides a relatively quick connection mechanism that does not require any threading, locking, or other manipulation of the male and female ends, it does require an obliquely angled insertion of the male coupling into the female coupling to allow for the lateral tabs on the male coupling to be vertically lowered and engaged with the corresponding lateral slots in the female coupling. In order to accommodate the oblique insertion of the male coupling, the female coupling has a tapered receiving port for the male coupling that has a significantly larger diameter than the inserted male coupling. To compensate for the large gap between the interior wall of the receiving port and the outer diameter of the male coupling, the female coupling typically includes a large compressible gasket lining the receiving port.

Conventional couplers have disadvantages in their designs, particularly with respect to water leakage between male and female portions of the coupler. Most have either one or two replaceable rubber gaskets to prevent the loss of water between the pipe and the coupler when pressure is applied. However, these conventional gaskets permit water to drain out whenever the line is shut off and the pressure is released. These conventional designs typically employ a thick and wide gasket between portions of the male and female portions of the coupler to compensate for the loose mechanical connection between the male and female portions, commonly referred to as a Chevron gasket. These gaskets are "drain" gaskets which leak water through the coupling when water pressure in the draglines falls. Thus, these gaskets do not prevent leakage of irrigation water at the couplers. This design presents a critical problem, especially in drought stricken areas where water resources are severely limited. Improved water conservation and application is imperative to future agricultural practices. However, water leakage is a persistent problem for drag line pipe couplings.

Other conventional irrigation pipe coupling designs have additional disadvantages. Another conventional design uses a mechanical, hinge-jointed latch to hold male and female couplings together. The latches of this style of couplings tends to slip on the pipe sections when towing the pipe sections to a new location. As a consequence, if the string of pipe sections is very long, it is often necessary to at least partially disassemble the line and tow the latter in sections, which must then be recoupled at the new location, in order to prevent parting of the line by slipping of the couplings from the pipe sections.

Improved coupling devices are needed to address the shortcomings discussed above.

SUMMARY OF THE INVENTION

This invention provides a new and improved couplings which avoid the above and other disadvantages of the existing irrigation pipe couplings. Mechanically engaging couplings are provided by this invention for connecting irrigation pipes typically used in sprinkler systems for the agricultural industry. The couplings may have two mating coupling parts which are each fixedly joined (e.g., by welding, threaded connection, pressure fitting, or other appropriate mechanisms) to an end of an irrigation pipe to enable the respective irrigation pipes to be reversibly connected end-to-end. One coupling part may be a female coupling and the other may be a male coupling. The female coupling may include a coupling cradle which receives the male coupling and cradles the second pipe when inserted into the cradle. The cradle may include a curved skid or sled structure with upwardly curving lateral portions for cradling the pipe, and a broad skid surface to allow joined female and male couplings to be dragged along the ground as they are moved into position for irrigation use with reduced friction and catching, while keeping sprinkler risers on the couplings positioned in an upright position.

The female coupling may include a receiver for the male coupling that includes a cylindrical section having an inner diameter that is only slightly larger than the outer diameter of the male coupling, such that the male coupling can be coaxially inserted into the cylindrical section of the female coupling for a tight fit. The cylindrical section of the female coupling may include a gasket (e.g., an O-ring style gasket) for frictional engagement with the outer surface of the male coupling to prevent leakage of water between the female coupling and the male coupling when they are engaged, regardless of the fluid pressure of the water within the irrigation pipes.

The fastening mechanism for engaging the female and male couplings allows the male coupling to be coaxially inserted into the female coupling receiver and allows for a tight, but reversible fit between the female coupling and the male coupling. After the male coupling is inserted into the female coupling, the fastening mechanism may be engaged by twisting interleaving fasteners on the female and male couplings. The interleaving fasteners may be one or more flange-like structures that are aligned and engaged in an interleaving fashion when one or both couplings are twisted through a predetermined arc length. The flange-like structures may run perpendicularly to the longitudinal axis of the irrigation pipes in the drag line and along the interior surface of the male and female couplings. In some embodiments, the interleaving fasteners may each be flange-like structures that run along the circumference of the couplings and overlap and interface when they are rotated after the male coupling is inserted into the receiver of the female coupling. In other embodiments one fastener may be a curved slot and a complementary flange that are interleaved by rotation after the couplings are twisted into the engaged position. The interleaving fasteners may be respectively positioned on the interior of the cradle of the female coupling (e.g., on the inner diameter thereof) and on the external diameter of the male coupling such that the interleaving fasteners reach alignment when the male coupling is fully inserted into the receiver of the female coupling.

The interleaving fasteners may be positioned on the female coupling and the male coupling such that they run perpendicular to the axial length of the irrigation pipe. This arrangement allow the fastener on the male coupling to be positioned into engagement with the fastener of the female coupling by rotating the male coupling (e.g., by rotating the irrigation pipe to which the male coupling is attached by hand, or alternatively with a pipe wrench or other tool) once the male coupling is fully inserted into the receiver of the female coupling and the interleaving fasteners are aligned. In some embodiments, the female coupling may include a cradle portion that has an open curved shape, where the cross-section of the cradle includes a curved wall (a semi-circular wall, circular arc-shaped wall, elliptical arc-shaped wall, etc.) around the longitudinal axis of the female coupling. An interleaving fastener may be positioned within the cradle with at least one partial flange structure that runs around the curved surface of the cradle and perpendicularly to the longitudinal axes of the female coupling and irrigation pipe. The interleaving fastener is positioned in the open cradle and outside of the receiver so that the complementary interleaving fastener of the male coupling can be rotated to engage the interleaving fastener of the female coupling after the male coupling is coaxially or substantially coaxially inserted into the female coupling. The radial length of the flange may vary in a range of about $\pi/10$) (~18°) to about $\pi$ (180°).

The interleaving fastener of the male coupling may include at least one partial flange structure fixedly positioned on the external diameter of the male coupling. The arc length of the flange may vary in a range of about $\pi/10$) (~18°) to about $\pi$ (180°). The degrees of rotation necessary to engage the interleaving fasteners of the male and female couplings will vary with the radial length of the interleaving fasteners. For example, and without limitation, where the cradle includes a fastener having a radial length of about 90° and the male coupling includes a flange having a radial length of about 90°, the flange may be fully interfacially engaged in the slot by rotating the male coupling through a 90° arc once the male coupling is fully inserted into the female coupling and the interleaving fastener of the male coupling (e.g., partial flange or slot) is aligned with the interleaving fastener of the female coupling (e.g., a partial flange or slot). Embodiments in which the male or female coupling is rotated through an arc length of 90° or less to engage the couplings are advantageous because they allow the couplings to be engaged without being obstructed by risers that may be attached to the female coupling (e.g., a pipe that rises vertically to deliver water to a sprinkler or other irrigation device).

In some embodiments, the interleaving fastener in the female coupling may include two partial flanges (e.g., parallel flanges) forming a slot in the cradle. The slot may run perpendicular to the longitudinal axis of the female coupling. The interleaving fastener on the male coupling may include a flange that is operable to slide into the slot. The interleaving fastener on the male coupling may have a cross-sectional shape that is complementary to the slot to allow for a tight fit. For example, and without limitation, the cross-sectional shape of the fastener of the male coupling may be triangular and the space within the slot may have a complementary shape thereto. In other embodiments, the slot may be formed on the male coupling and a single partial flange may be positioned on the cradle for insertion into the slot.

In other embodiments, and without limitation, the interleaving fasteners may have reinforcing structures to provide structural strength against axial tension during the process of moving (longitudinal dragging) the connected irrigation pipes in the drag line. For example, and without limitation, the fasteners of the male and female couplings may each have reinforcing ribs or gussets on the side of the fastener opposite from the side that interfaces with the other fastener. In one example, the male and female fasteners may have one or more reinforcing ribs that are perpendicular to the flange and parallel to the axis of the irrigation pipes linked in a drag line to prevent mechanical failure when the drag line is moved and resulting shear stress is applied to the fastener. In some embodiments, and without limitation, the male and/or female fastener may be have structure that has a triangular or substantially triangular cross-section through at least a portion thereof such that it has substantial mechanical strength against shear stress caused by movement of the drag line. The foregoing structure features are examples, and it will be understood by those having skill in the art that the fasteners of the present invention may have other reinforcing structures or structural features, e.g., the fasteners may have other cross-sectional shapes for reinforcement such as a quadrant of a circle or an ellipse, and other appropriate shapes.

In some embodiments, and without limitation, one or both of the interleaving fasteners may include a stopper mechanism for arresting the rotation of the fasteners when they are being engaged. For example, and without limitation, the fastener on the female coupling may have a plate, tab, or other stopper structure on an end thereof, such that as one or both couplings are rotated the fastener of the male coupling (e.g., a flange) butts up against the stopper, thereby arresting the rotation of the couplings and defining their relative positions when fully engaged. In some examples, the stopper may be on the far end of the fastener of the female coupling (e.g., it may be a closed end of a slot or a plate, tab, or other stopper structure on the far end of a flange). In other examples, the stopper may be on or near an end of the fastener of the male coupling (e.g., a plate, tab, or other stopper structure on the near end of a flange). In some examples, both the fasteners of the male coupling and the female coupling may have stopper structures. In some examples, and without limitation, the one or more stoppers may be positioned along the fasteners such that they arrest the rotation of the couplings with risers in the female couplings positioned vertically or at another preferred orientation to provide for ease of installation.

The female and male couplings may be made from various rigid materials, including metals, polymers, ceramic, and/or composite materials. For example, and without limitation, the couplings may be made from aluminum metal or an alloy thereof, e.g., through a casting process, a milling process, a printing and sintering process, or other appropriate method. Other metal materials may be utilized using similar processes, such as iron alloys, stainless steel, etc. In other examples, and without limitation, the male and female couplings may be made from a polymer material such as polyvinyl chloride, formed by a molding process. The interleaving fasteners may be formed integrally with female and male couplings during the formation process thereof (e.g., a molding process, a milling process, etc.).

The male and female couplings are assembled to join to pipe ends to facilitate to end-to-end coupling of the pipes (e.g., to form drag lines). In some embodiments, each type of coupling may be fixedly attached (e.g., welded, cold-welded, chemically fused, etc.) onto opposite ends of a predetermined length of pipe such that the radial position of the interleaving fasteners are in general alignment. For example, and without limitation, the female coupling having a first interleaving fastener in its cradle may be fixedly attached to a first end of a length of pipe, and a male coupling having a second interleaving fastener (e.g., a partial flange) may be attached to an opposite end of the pipe, such that the partial flange or slot of the male coupling is centered at the same radial position with respect to the cross-section of the pipe (e.g., at) 0° as the fastener (e.g., a partial flange or slot) in the cradle of the female coupling (e.g., which is also centered at about) 0°. However, it is to be understood that the interleaving fasteners of the male and female couplings do not need to be centered at the same radial position, and can be offset from one another so long as the fastener of the male coupling of one pipe can be engaged with the female coupling of another pipe such that their respective interleaving fasteners overlap. In other embodiments, there may be two or more different kinds of pipe assemblies: e.g., (1) pipes to which male couplings have been attached to each end of the same pipe, and (2) pipes to which female couplings have been attached to each end of the same pipe. In such embodiments, the pipes having female couplings may be laid on the ground with the cradles set with their sleds placed on the ground, and the pipes having male coupling can be inserted into the female couplings and rotated to connect the pipes end to end without having to rotated the female couplings.

The pipes are connected end-to-end along crop rows or fields to achieve the required irrigation coverage. In some embodiments, the female couplings may include riser connectors to which a riser may be attached for connecting sprinklers or sprinkler lines to supply water to sprinkler installations or mobile sprinkler/irrigation systems. The riser may have a length in a range of about 6 in. to about 36 in. for supporting and delivering fluid to sprinklers various kinds of sprinklers or other water distribution devices. Consideration is given to the required spacing of the sprinklers as to provide proper coverage. The pipes are aligned end to end along crop rows and connected using the male and female couplings. The male couplings may be aligned with the female coupling such that the fastener of the male coupling (e.g., a partial flange or slot) is positioned on the upper side of the pipe. The male coupling may then be inserted into the female coupling in a coaxially aligned manner without any need for an obliquely angled approach. Once the male coupling is fully inserted into the female coupling such that (1) the outer diameter of the male coupling is pressure fitted into the gasket within the female coupling and (2) the fastener of the male coupling is aligned with the fastener of the female coupling (e.g., a partial flange or slot), the male coupling can be rotated such that its fastener overlaps and interfaces with the fastener of the female coupling (e.g., the partial flanges overlap and interface, or a partial flange of one is slotted into a slot in the other). This coupling process may be repeated until a desired length of connected irrigation pipes is achieved. The string of connected irrigation pipes may then be connected to a main water line via other fittings and/or valves. The engagement of the male coupling and the female coupling may provide a secure watertight seal between the pipes preventing water loss from the irrigation pipe string, even when water in the pipes is depressurized or is flowing at low pressures. The connected irrigation pipes may also be towable without disassembly.

Accordingly, the present invention provides irrigation fittings that are simple and efficient to use. The pipe couplings of this invention can be reversibly disengaged simply by rotating the male coupling through a sufficient angle for quick access and disassembly, for example, for purposes of moving the irrigation pipes, cleaning, or repair. These fittings also can minimize labor and expense during the movement of the irrigation system, and can be engaged and disengaged without breaking apart welds, complicated fasteners, or any moving parts.

In one aspect, the present invention relates to a reversible mechanically engaging pipe coupling system for making a fluid connection between conduits, comprising a male coupling having a first fastening structure on an outer surface thereof and an insertion portion; and a female coupling having a specially configured end having a receiver into which the insertion portion may be positioned and a second fastening structure operable to be reversibly mechanically engaged with the first fastening structure, wherein the insertion portion of the male coupling can be inserted into the receiver axially without the fasteners obstructing the insertion of the insertion portion and the first and second fasteners can be engaged by rotation of one or both of the male coupling and the female coupling after the insertion portion is advanced into the receiver. The first fastener may comprise a partial flange on the outer surface of the male coupling. The second fastener may comprise a partial flange on an interior surface of the female coupling. The second fastener may be a slot positioned in a cradle positioned anteriorly to the receiver. The female coupling may include a gasket positioned within the receiver. The female coupling may include a cradle having a partial circumferential wall adjacent to the receiver, wherein the fastener is positioned on the interior side of the cradle. The female coupling may further comprise a riser connector for receiving a riser for connecting to a fluid delivery conduit. The coupling system may further comprising a riser attached to the riser connector, the riser having a check valve therein. The mechanical connection between the male coupling and female coupling may be watertight. The male coupling and female coupling may be mechanically connected by the first and second fasteners, with no other connecting mechanisms. The male coupling may have no moving parts and the female coupling has not moving parts.

In a second aspect, the present invention relates to a towable conduit coupling system operable for reversibly mechanically linking conduits, comprising a first pipe and a second pipe; a male coupling having first pipe receiving end operable to be mechanically connected to the first pipe and a first coupling end, and a first fastening structure on an outer surface thereof and an insertion portion; and a female coupling having second pipe receiving end operable to be mechanically connect to the second pipe and a second coupling end, the second coupling end having a receiver into which the first coupling end may be positioned and a second fastening structure operable to be reversibly mechanically engaged with the first fastening structure, wherein the insertion portion of the first coupling end can be inserted into the receiver axially without the fasteners obstructing the insertion of the first coupling end and the first and second fasteners can be engaged by rotation of one or both of the male coupling and the female coupling after the first coupling end is inserted into the receiver. The female coupling includes a cradle, wherein the receiver has a complete circumference into which the first coupling end may be inserted and the cradle has an incomplete circumference and the second fastening structure is located on an internal surface of the cradle. The female coupling may include comprise a gasket in the receiver for providing a fluid tight seal between the first and second coupling ends. The first coupling may include an insertion portion, the insertion portion being operable to be inserted into the receiver axially without the first and second fasteners obstructing the insertion of the insertion portion. The first fastener may comprise a partial flange on the outer surface of the male coupling. The second fastener may be a partial flange on an interior surface of the female coupling. The second fastener may be a slot positioned on an interior surface of the female coupling. The second fastener may be a partial flange positioned in a cradle positioned anteriorly to the receiver. The second fastener may be a slot positioned in a cradle positioned anteriorly to the receiver. The first and second fasteners may be reinforced by gussets. The male coupling and female coupling may be mechanically connected by the first and second fasteners, with no other connecting mechanisms. The male coupling may have no moving parts and the female coupling has not moving parts.

In a third aspect, the present invention relates to a method of connecting irrigation conduits, comprising inserting an insertion portion of a male coupling into a female coupling having a specially configured end with a receiver into which the insertion portion may be positioned; advancing the insertion portion into the receiver until a first fastening structure on an outer surface of the male coupling is aligned with a second fastening structure on the female coupling; and rotating one or both of the male coupling and the female coupling until the first fastening structure overlaps with the second fastening structure. The insertion portion of the male coupling may be inserted into the receiver coaxially without the first and second fasteners obstructing the insertion of the insertion portion. The first fastener may comprise a partial flange on the outer surface of the male coupling. The second fastener may comprise a partial flange on an interior surface of the female coupling. The female coupling may comprise a gasket positioned within the receiver that creates a watertight seal against the insertion portion of the male coupling. The female coupling may include a cradle having a partial circumferential wall adjacent to the receiver, wherein the second fastener is positioned on the interior side of the cradle. The method may further comprise connecting a riser to a riser connector in the female coupling, the riser being operable to deliver fluid to a fluid distribution device. The method may further comprise connecting a riser to a riser connector in the female coupling, the riser being operable to deliver fluid to a fluid distribution device. The male coupling and female coupling may be mechanically connected by the first and second fasteners, with no other connecting mechanisms. The male coupling may have no moving parts and the female coupling may have no moving parts.

Further objects and aspects of the present invention will be apparent from the description provided herein.

DETAILED DESCRIPTION OF THE DRAWINGS

Figure 1A:
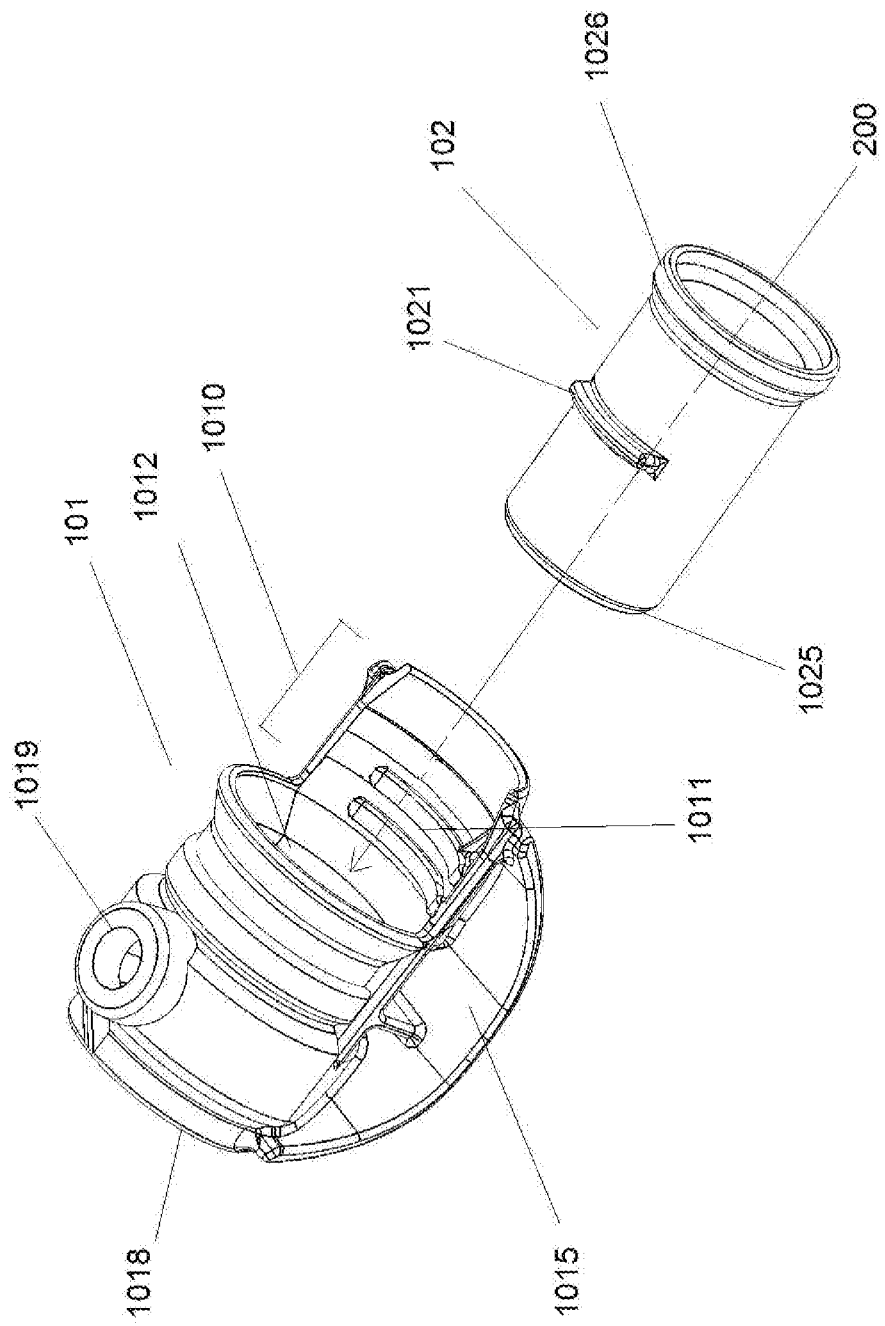
FIG. 1A shows a perspective view of male and female couplings according to an embodiment of the present invention.
Figure 1B:
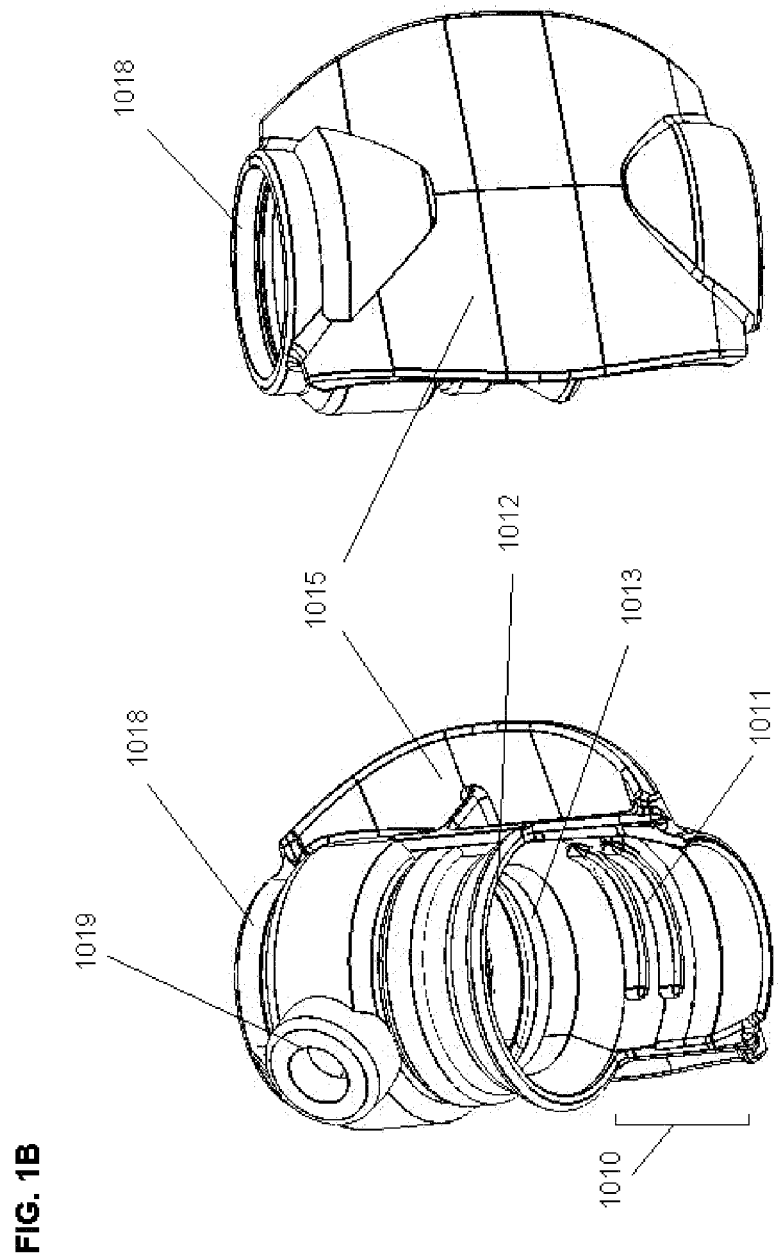
FIG. 1B shows perspective views of a female coupling according to an embodiment of the present invention.
Figure 1C:
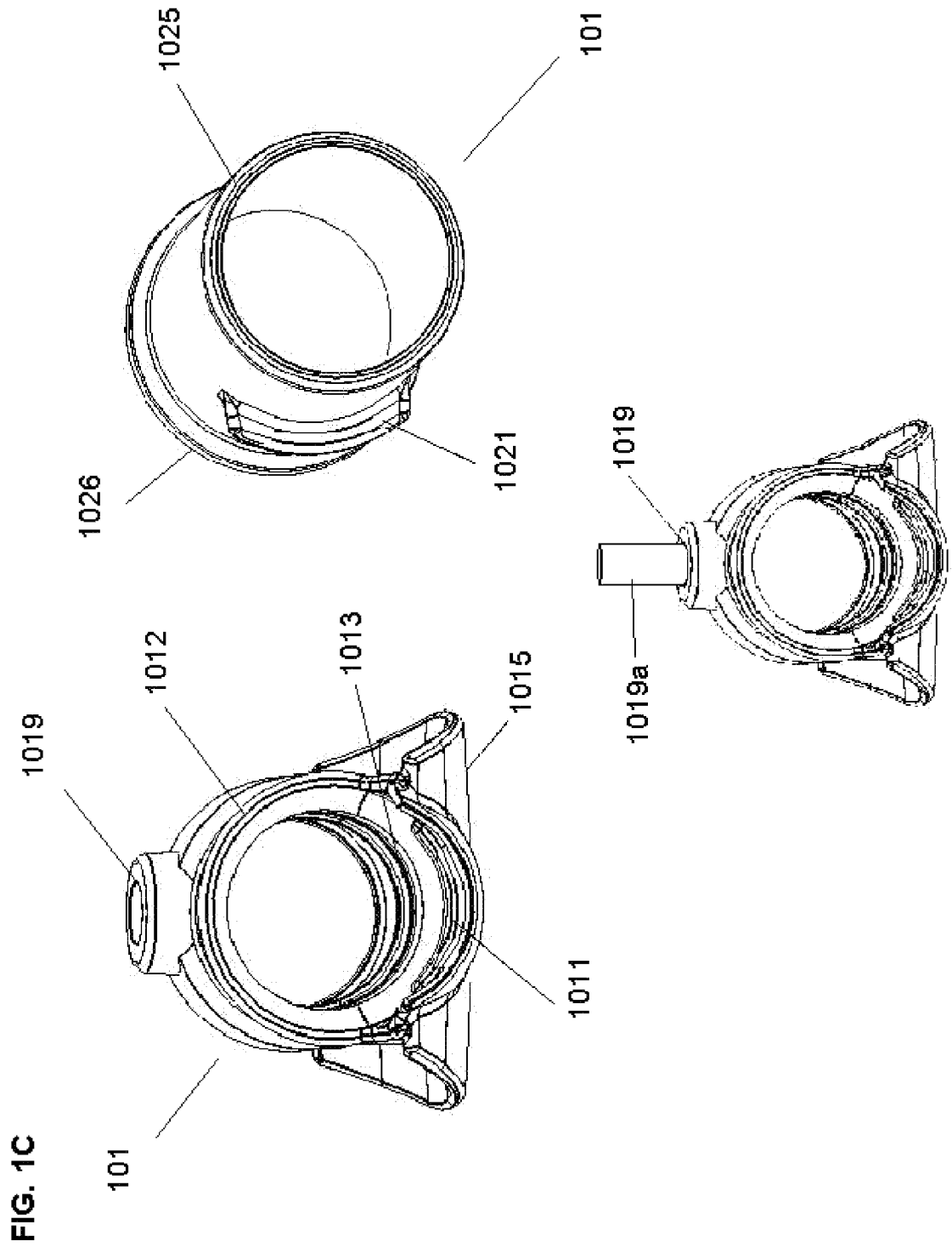
FIG. 1C shows perspective views of male and female couplings according to an embodiment of the present invention.
Figure 1D:
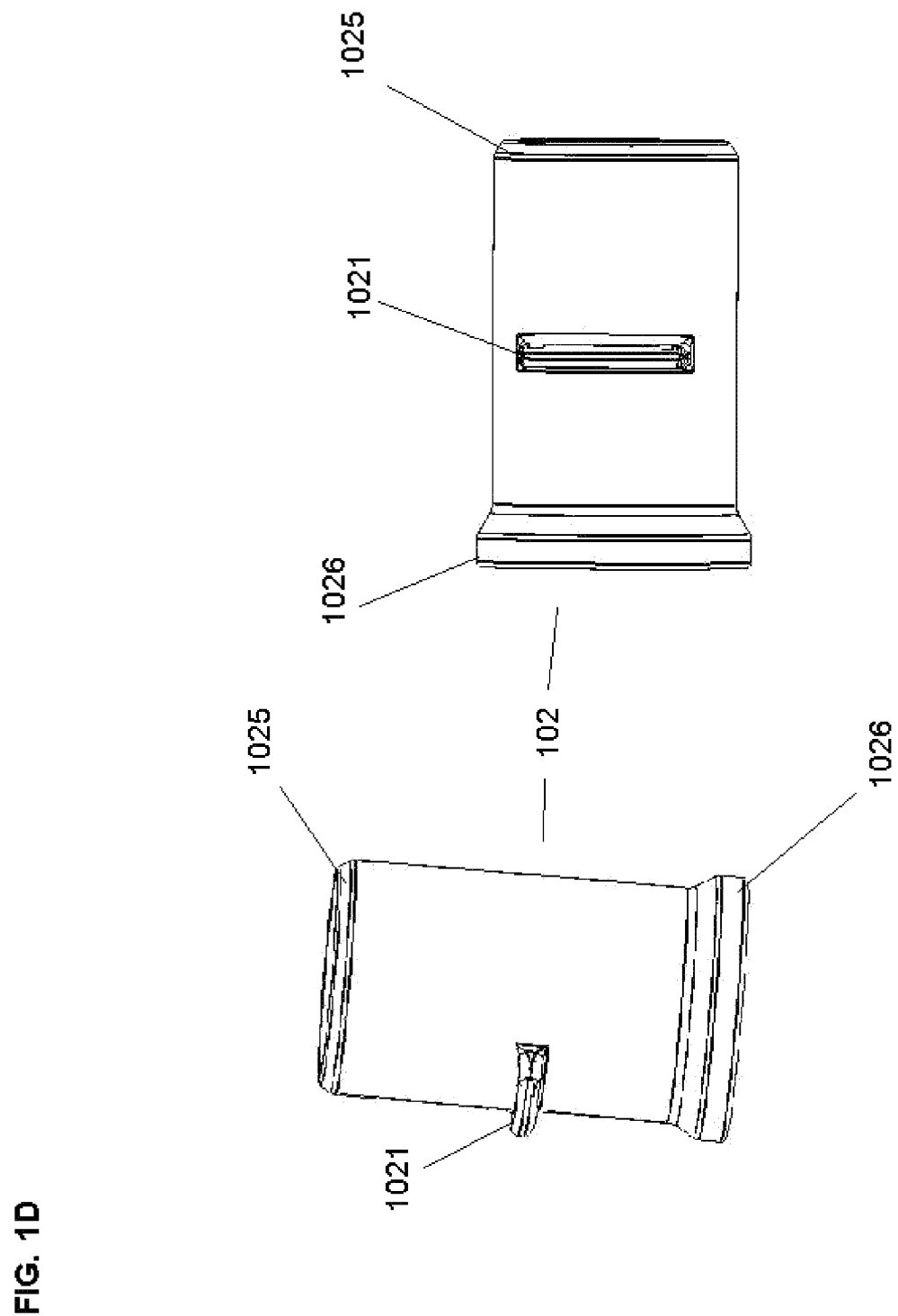
FIG. 1D shows perspective views of a male coupling according to an embodiment of the present invention

Reference will now be made in detail to certain embodiments of the invention, examples of which are illustrated in the accompanying drawings. While the invention will be described in reference to these figures and certain implementations and examples of the embodiments, it will be understood that such implementations and examples are not intended to limit the invention. To the contrary, the invention is intended to cover alternatives, modifications, and equivalents that are included within the spirit and scope of the invention as defined by the claims. In the following disclosure, specific details are given to provide a thorough understanding of the invention. References to various features of the "present invention" throughout this document do not mean that all claimed embodiments or methods must include the referenced features. It will be apparent to one skilled in the art that the present invention may be practiced without these specific details or features.

Reference will be made to the exemplary illustrations in the accompanying drawings, and like reference characters may be used to designate like or corresponding parts throughout the several views of the drawings.

As seen in FIGS. 1A-1D, the present invention provides novel couplings for connecting pipes (e.g., irrigation pipes) with liquid tight or substantially liquid tight engagement between the couplings. The present invention may include both male and female couplings having complementary fasteners that are engaged by relative rotation of the couplings after the male coupling is fully inserted into the female coupling. Once the male coupling is fully inserted into the female coupling, the fasteners of the male and female couplings may be aligned such that rotation of either or both of the couplings results in interfacial engagement of the fasteners preventing the couplings from being separated by axial tension, flexion stress, or other forces caused by, e.g., dragging or otherwise moving the pipes without disengagement of the fasteners.

As shown in FIG. 1A, the female coupling 101 may having a cradle 1010 that includes a fastener 1011 positioned in the cradle such that it runs perpendicular or substantially perpendicular to the axial direction 200 of the couplings. The fastener 1011 may be a slot formed in the cradle 1010 by protrusions formed in the interior wall of the cradle 1010. A male coupling 102 may have a complementary fastener 1021 operable to be slotted into the fastener 1011 after the male coupling is inserted in a receiver 1012 in the female coupling. The anterior end 1025 of the male coupling 102 may be inserted and advanced into the receiver 1012 to the point that the fastener 1021 is aligned with the slot of fastener 1011, such that fastener 1021 is positioned in an interfacing manner in the slot, thereby preventing the male coupling from being dislodged from the female coupling by axial stress, pulling on the couplings, or water pressure.

The female coupling 101 may include several features that aid in functioning as a connector for irrigation pipes and other kinds of conduits. The female coupling may include a skid plate or sled 1015 that may be placed on the ground or other surface. The skid plate 1015 may have a width that is greater than the outer diameter of the cylindrical portions of the female coupling (e.g., the receiver) to both (1) act as a broad surface operable to slide over the ground or other surface and (2) aid in preventing the female coupling 101 from flipping over (e.g., while a string of pipes connected by the presently disclosed couplings is dragged along the ground). The skid plate 1015 may have a curvature 1015A that allows the skid plate to pass over bumps or other obstructions on the surface over which it may be moved. The edges of the skid plate 1015 may be beveled on a bottom side thereof in order to aid in reducing obstruction.

The female coupling 101 may also include a riser connector 1019 on an upper surface thereof to allow for riser to be attached thereto to allow fluid to pass from the linked conduits attached to the female coupling 101 to a conduit for providing fluid (e.g., irrigation water) to an end use device, such as a sprinkler. For example, and without limitation, the riser connector 1019 may have opening or orifice to which a riser 1019a may be attached (e.g., by threaded connection, pressure fitting, adhesive, etc.) for the purpose of connecting to a hose, pipe, or other conduit (see FIG. 1C). In such examples, the attached riser conduit 1019a may deliver water to a sprinkler or other irrigation structure for dispersing water to a crop field. The riser may include a check valve in order to maintain pressure in the linked pipe system during non-use of the riser.

The receiver 1012 of the female coupling 101 may have a complementary shape to the outer perimeter structure of the male coupling 102. For example, and without limitation, the receiver 1012 may be a cylindrical structure having an inner diameter that is slightly larger than the outer diameter of the male coupling 102 to allow the male coupling 102 to be inserted into the female coupling with a snug fit. In some embodiments, the receiver 1012 may include a gasket 1013 along the inner wall of the female coupling 101 to allow for a watertight fit between the receiver 1012 and the outer surface of the male coupling 102. The gasket 1013 may made from one or more materials, including a compressible material such as vulcanized rubber, ethylene propylene diene terpolymer, polychloroprene PC-rubber materials, styrene-butadiene rubber, silicone rubber, vinyl rubbers, polytetrafluoroethene (PTFE, e.g., Teflon®) or other appropriate materials. The inner diameter of the gasket 1013 may be slightly smaller than the inner diameter of the receiver 1012 in order to provide a snug pressure fit on the outer surface of the male coupling 102. The gasket 1013 may have an axial length within the receiver sufficient to create a water tight seal with the outer surface of the male coupling 102. For example, and without limitation, the gasket 1013 may have a axial length in a range of about 1/16 inch to about 2 inches, or any range of values therein (e.g., about 1/16 in. to about 1.5 in., about 1/8 in. to about 1 in., about 1/2 in. to about 3/4 in., etc.).

In some embodiments, and without limitation, the gasket 1013 may be a simple O-ring gasket having an inner diameter slightly smaller than the inner diameter of the female coupling 101, and a sufficient axial length to provide a watertight seal on the outer surface of the male coupling 102. In such embodiments, the gasket may not include any internal cavities or separable components or segments. In such embodiments, the gasket 1013 may be a single ring-shaped structure that is nested within a complementary annular cavity in the interior wall of the receiver 1013.

The female coupling 101 may include a conduit connector 1018 for attachment to a conduit structure (e.g., an irrigation pipe or other conduit). The connector 1018 may be attached to a conduit by adhesive, by a welding process, or other method, depending on the material of the female coupling 101 and the conduit. For example, and without limitation, if the female coupling 101 and conduit are made from a metal material (e.g., aluminum or steel), the conduit connector 1018 and the conduit may be fixedly joined by welding, soldering, clamping, or similar process. For example, and without limitation, if the female coupling 101 and conduit are made from a polymer material (e.g., polyvinyl chloride), the conduit connector 1018 and the conduit may be fixedly joined by adhesive, chemical welding, or similar process.

The male coupling 102 may include a distal portion 1025 for insertion into the receiver 1012, a fastener 1021, and a conduit connector 1026. The distal portion 1025 may have a complementary shape to the internal shape of the receiver 1012, such that the distal portion 1025 may be inserted into the receiver 1012 for a snug complementary fit. In some embodiments, and without limitation, the distal portion 1025 may having a cylindrical shape complementary to the receiver 1012. The distal portion 1025 may have a beveled edge to aid in insertion of the distal end 1025 into the receiver 1012.

The fastener 1021 may be a partial flange or plate-like structure having a length that runs perpendicular to the axial direction 200. The fastener 1021 may run along the outer peripheral surface of the male coupling 102 for a limited arc length in order to allow the distal portion 1025 to be axially inserted into the receiver 1012 of the female coupling 101 without obstruction. The arc length of the fastener 1021 may be in a range of about $\pi/10$ (~18°) to about $\pi$ (~180°). The degrees of rotation necessary to engage the interleaving fasteners of the male and female couplings 102 and 101 will vary with the radial length of the interleaving fasteners 1011 and 1021. For example, and without limitation, where the cradle includes a slot fastener having a radial length of about 90° and the male coupling includes a flange having a radial length of about 90°, the flange may be fully interfacially engaged in the slot by rotating the male coupling through a 90° arc once the male coupling is fulling inserted into the female coupling and the flange is aligned with the slot. The fastener 1021 may be positioned a predetermined distance from the distal edge of the distal portion 1025 to enable the distal portion 1025 to be sufficiently inserted into the receiver 1012 to create a watertight seal when the fastener 1021 is aligned with the fastener 1011.

The conduit connector 1026 on the male coupling 102 may allow for attachment to a conduit structure (e.g., an irrigation pipe or other conduit). In some embodiments, and without limitation, the conduit connector 1026 may be spaced from the fastener 1021 by a sufficient distance such that the conduit connector sits beyond or at the proximal edge of the cradle 1010 so as not to obstruct the male coupling from being fully inserted into the cradle 1010 and coupled to the female coupling 101 and allowing for proper alignment of the fasteners 1011 and 1021.

The connector 1026 may be attached to a conduit by adhesive, by a welding process, or other method, depending on the material of the male coupling 102 and the conduit. For example, and without limitation, if the male coupling 102 and conduit are made from a metal material, the conduit connector 1018 and the conduit may be fixedly joined by welding, soldering, clamping, or other suitable process. For example, and without limitation, if the male coupling 102 and conduit are made from a polymer material (e.g., polyvinyl chloride), the conduit connector 1018 and the conduit may be fixedly joined by adhesive, chemical welding, or other suitable process. In some embodiments, and without limitation, the male coupling 102 maybe a cylindrical structure having the same or a similar internal diameter as the conduit to which it is connected. This may allow for the avoidance of unnecessary turbulence or pressure fluctuations. In such embodiments, the conduit connector 1026 may be an annular enlargement at the proximal end of the male coupling 102 having an inner diameter that is slightly larger than the outer diameter of the conduit, to allow for a tight fit and a watertight seal. To illustrate, FIGS. 5A-5D show the couplings attached to conduit at conduit connectors 1018 and 1026.

In other embodiments, the diameter of the male coupling may be larger than the conduit and the conduit may be slipped into the male coupling 102. In still other embodiments, the male coupling may have an outer diameter that is slightly less than the inner diameter of the conduit and the conduit may be slipped over the male coupling.

Figure 2A:
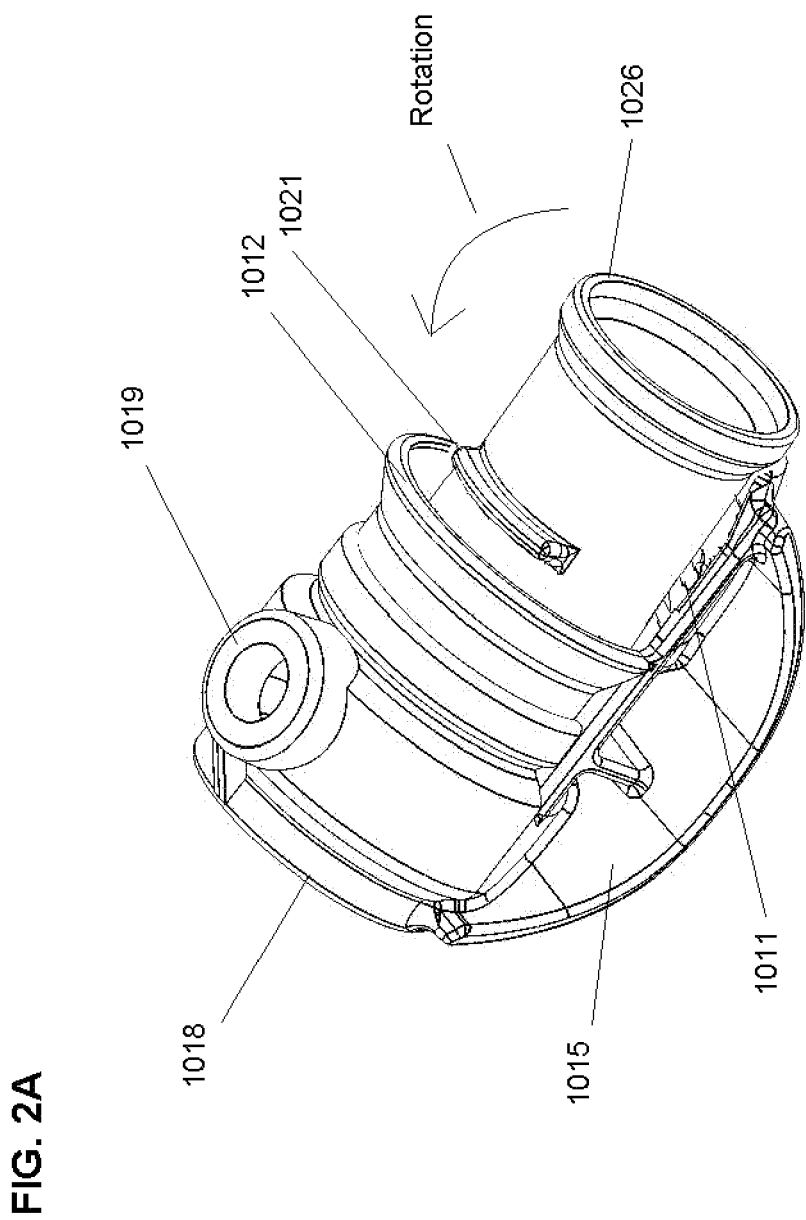
FIG. 2A shows a process of connecting male and female couplings according to an embodiment of the present invention.
Figure 2B:
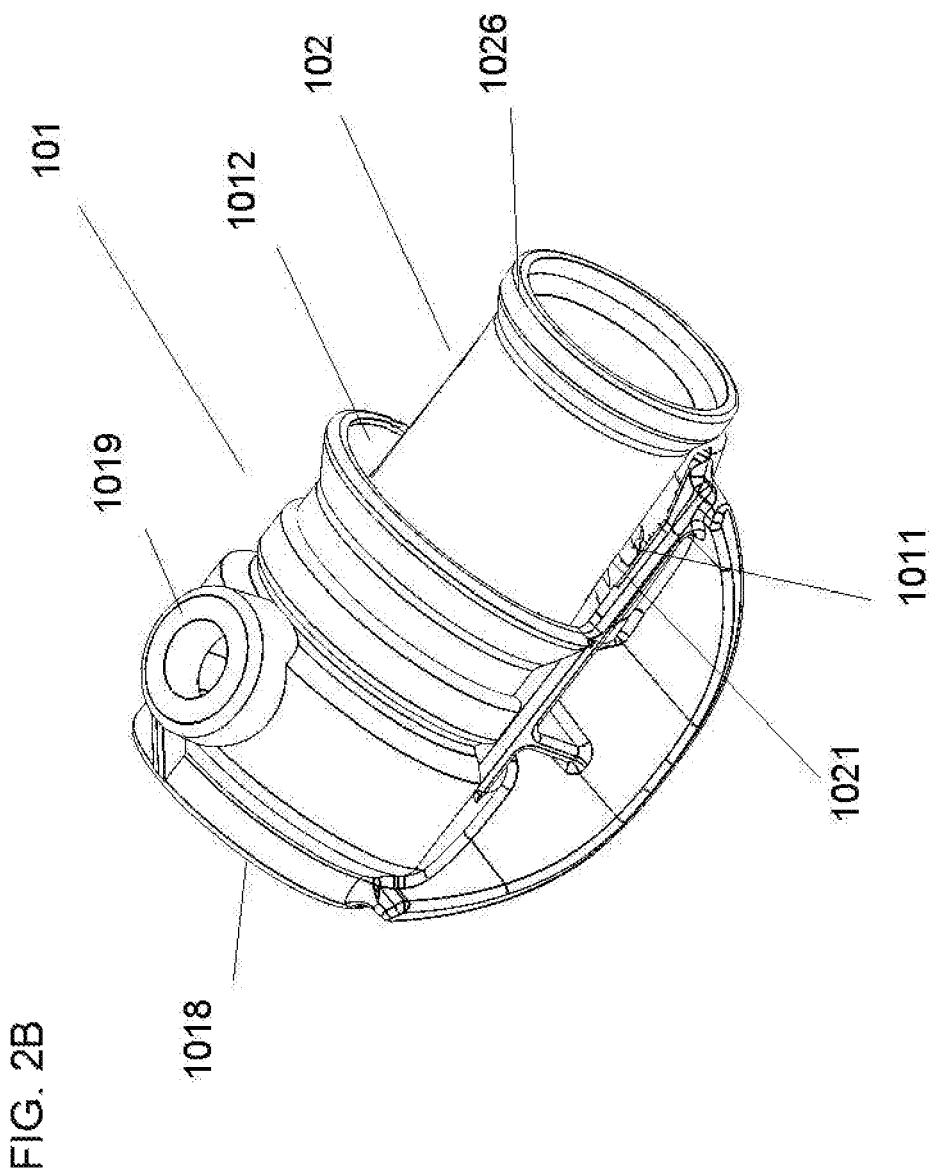
FIG. 2B shows a perspective view of connected male and female couplings according to an embodiment of the present invention.

As shown in FIGS. 2A-2B, the female and male couplings 101 and 102 may be reversibly joined together to provide both an improved coupling mechanism for lengths of conduit and a connection point to the conduit to access material flowing therein. The distal end 1025 of the male coupling 102 may be coaxially inserted into the receiver 1012 of the female coupling 101. Such coaxial insertion may include (1) aligning the distal end 1025 of the male coupling 102 with the receiver 1012 in a substantially coaxial manner around the axial direction 200 without any significant obliqueness in the relative orientation of the male and female couplings, (2) advancing the distal end 1025 of the male coupling 102 into the receiver 1012 of the female coupling under to the fastener 1021 is aligned with the fastener 1011, and (3) rotating the male coupling 102 (or alternatively the female coupling 101) through an arc length that brings the fastener 1021 fully into interfacial alignment with the slot 1011 so that the fastener 1021 is nested within the slot. Several conduit lengths may be connected to one another end-to-end using the male and female couplings disclosed herein to build long chains of conduit (e.g., irrigation draglines) that are capable of being moved (e.g., dragged) along the ground without separation at the male-female couplings.

Figure 3A:
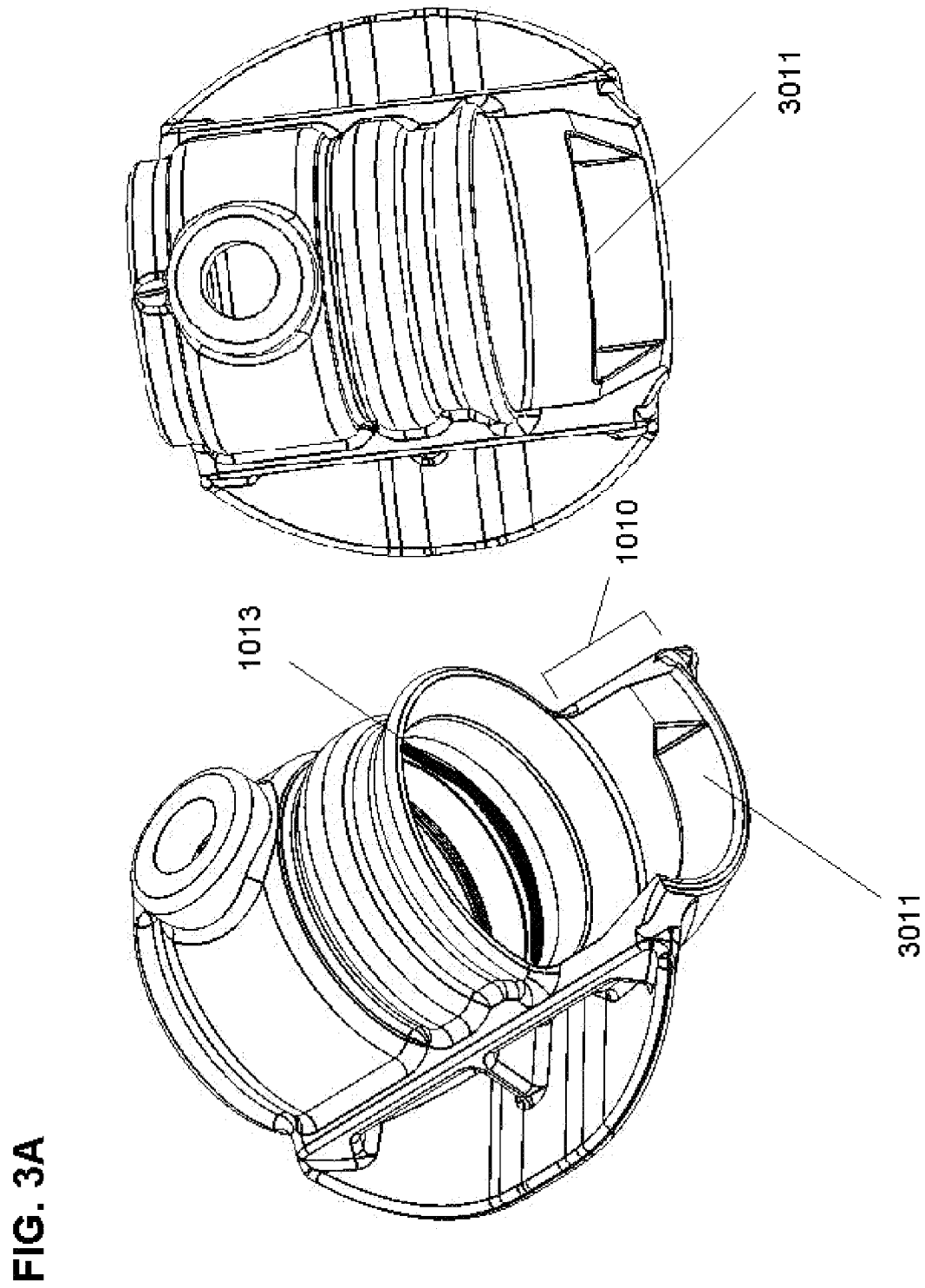
FIG. 3A shows perspective views of a female coupling according to an embodiment of the present invention.

FIG. 3A provides a view of another embodiment of the female coupling of the present invention. The features and function of the embodiment of FIG. 3A are substantially the same of other embodiments described herein. The fastener of the embodiment of FIG. 3A is somewhat different from those shown in other figures herein. The fastener 3011 has a single partial flange positioned within the cradle. In such embodiments, the male coupling can be axially advanced into the receiver 1012 until the fastener 1021 of the male coupling is positioned past the fastener 3011. The male coupling can then be rotated sufficiently to place the fastener 1012 in interfacing proximity to the fastener 3011, such that axial pull on the conduits attached to the female and male couplings does not separate the fasteners. In some examples, and without limitation, the fastener on the female coupling may be located at the proximal end of the cradle. The placement near the proximal edge also allows the shape of the fastener 3011 to be a bit more robust, having a triangular or substantially triangular cross-section that can resist shear stress applied to it when the irrigation pipe string is dragged along the ground. This arrangement may also provide advantages in that it may allow the overall length of the female coupling to be reduced resulting in a reduction in the amount of material required to produce the female coupling and an economic savings on material costs.

Figure 3B:
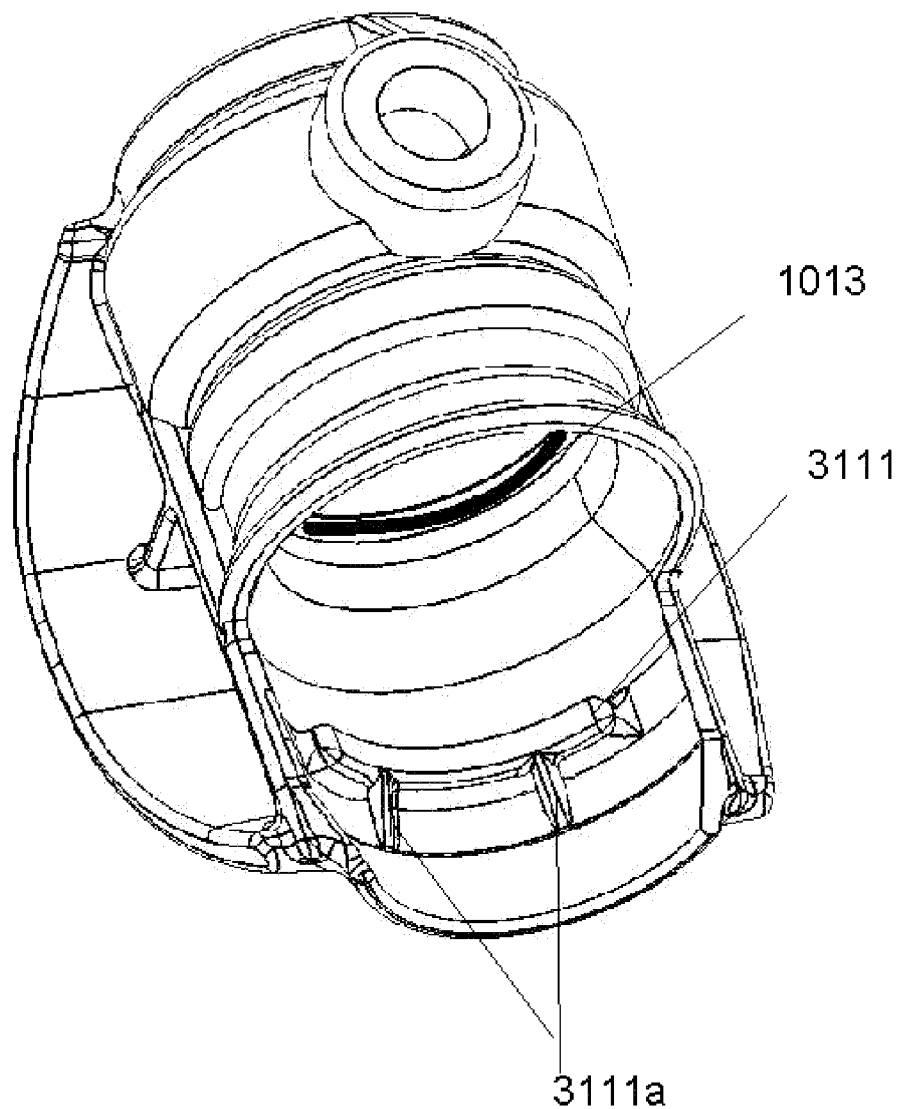
FIG. 3B shows a perspective view of a female coupling according to an embodiment of the present invention.

FIG. 3B shows another embodiment in which the fastener of the female coupling is more robust for resisting shear stress. The fastener 3111 may include ribs or gussets 3111a to reinforce the fastener 3111 and prevent mechanical failure when shear stress is applied by the dragging of the irrigation pipe string held together by the couplings.

Figure 4A:
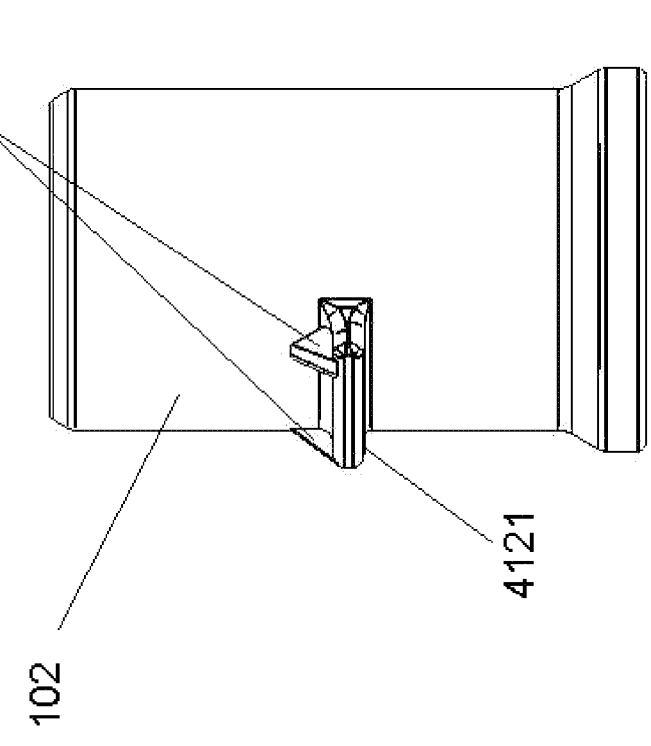
FIG. 4A shows a side elevation view of a male coupling according to an embodiment of the present invention.
Figure 4B:
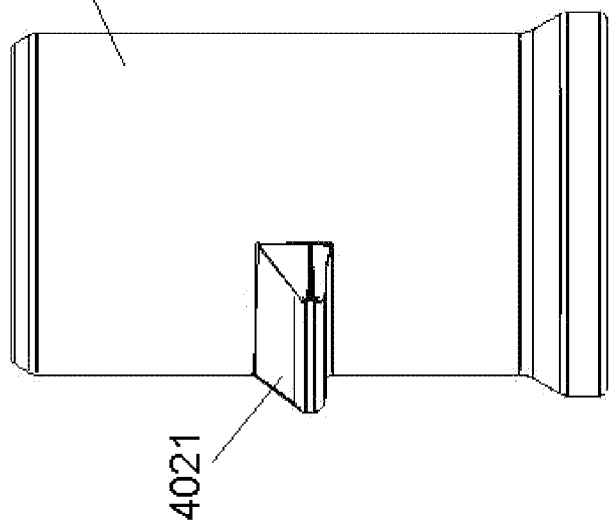
FIG. 4B shows a side elevation view of a male coupling according to an embodiment of the present invention.

The male coupling may also have a more robust design for resisting shear stress. As shown in FIG. 4A, the male coupling may have a fastener 4021 triangular or substantially triangular cross-section that can resist shear stress applied to it when the irrigation pipe string is dragged along the ground. The features and function of the embodiment of FIG. 4A are substantially the same of other embodiments described herein. Also, as shown in 4B, the male coupling may have a fastener 4121 that includes ribs or gussets 4121a to reinforce the fastener 4121 and prevent mechanical failure when shear stress is applied by the dragging of the irrigation pipe string held together by the couplings. As a further example of how the present invention is implemented, FIGS. 5A-5D demonstrate the engagement of the female and male couplings shown in FIGS. 3A and 4B. Additionally, FIGS. 5A-5D show the couplings with irrigation pipes attached thereto. Irrigation pipe 501 is attached to the female coupling 101 at conduit connector 1018, and irrigation pipe 502 is attached to male coupling 102 at conduit connector 1026. The female coupling 101 and male coupling 102 may be reversibly joined together to provide both an improved coupling mechanism for irrigation pipes 501 and 502 and a connection point to the conduit to access material flowing therein.

Figure 5A:
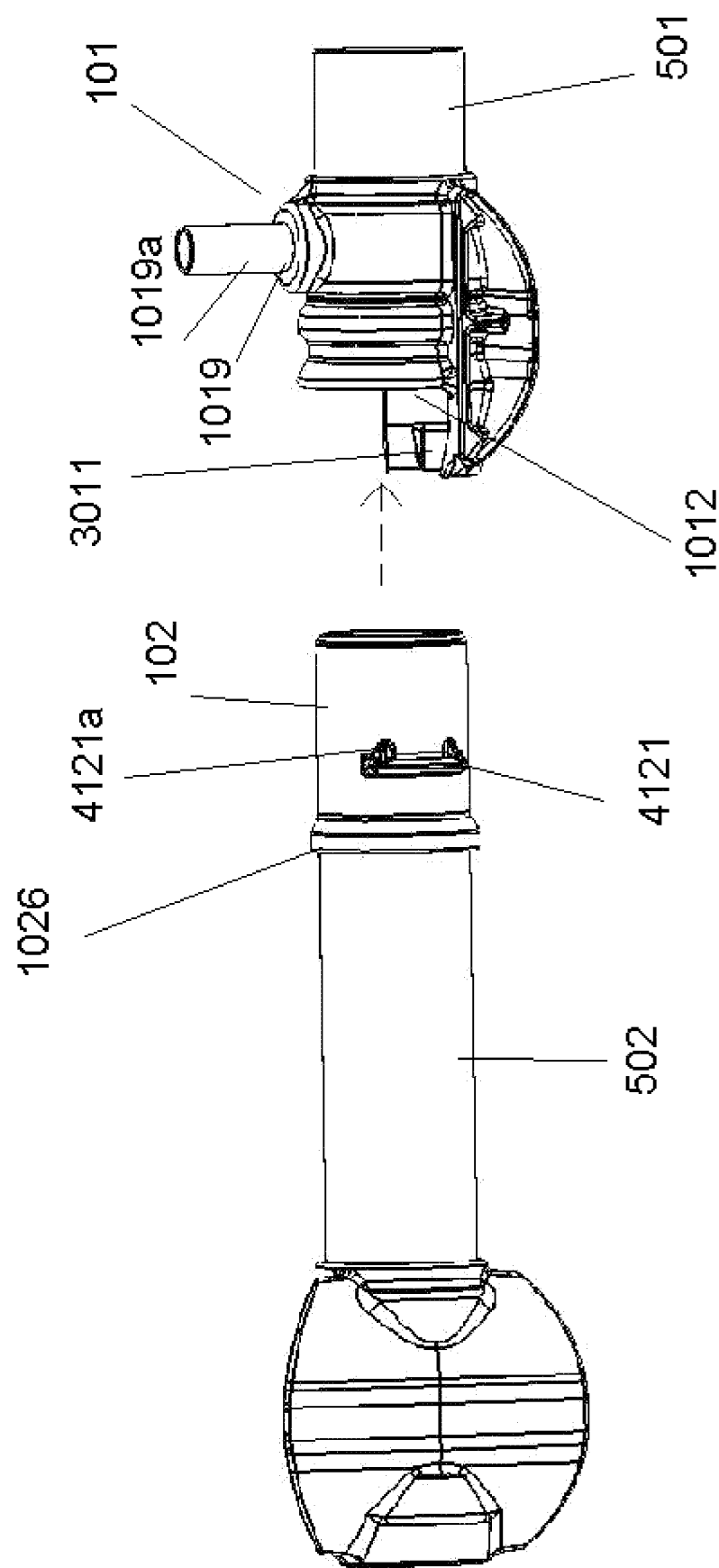
FIG. 5A shows a side elevation view of a male coupling and a female coupling according to an embodiment of the present invention.
Figure 5B:
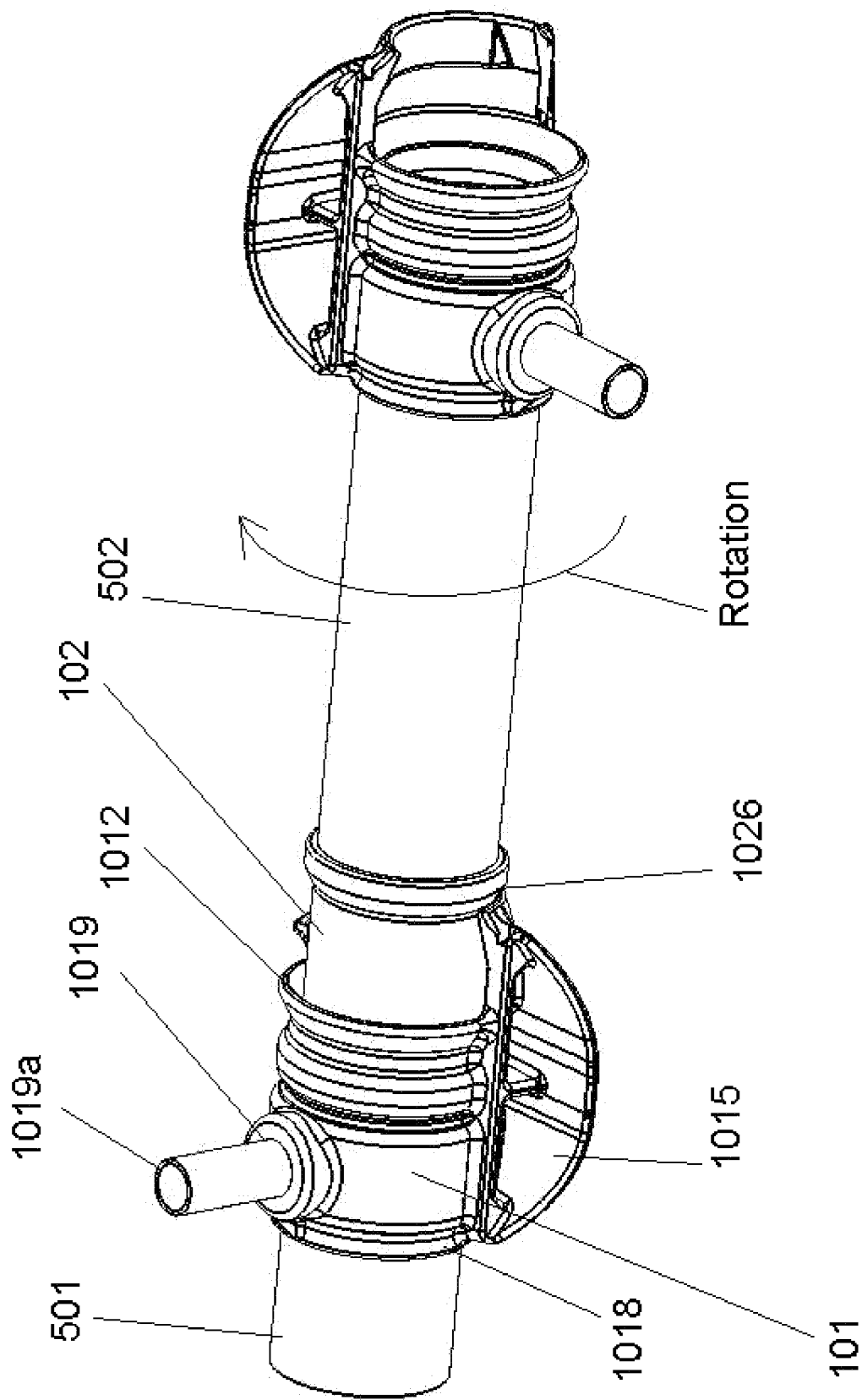
FIG. 5B a side perspective view of a male coupling and a female coupling according to an embodiment of the present invention.
Figure 5C:
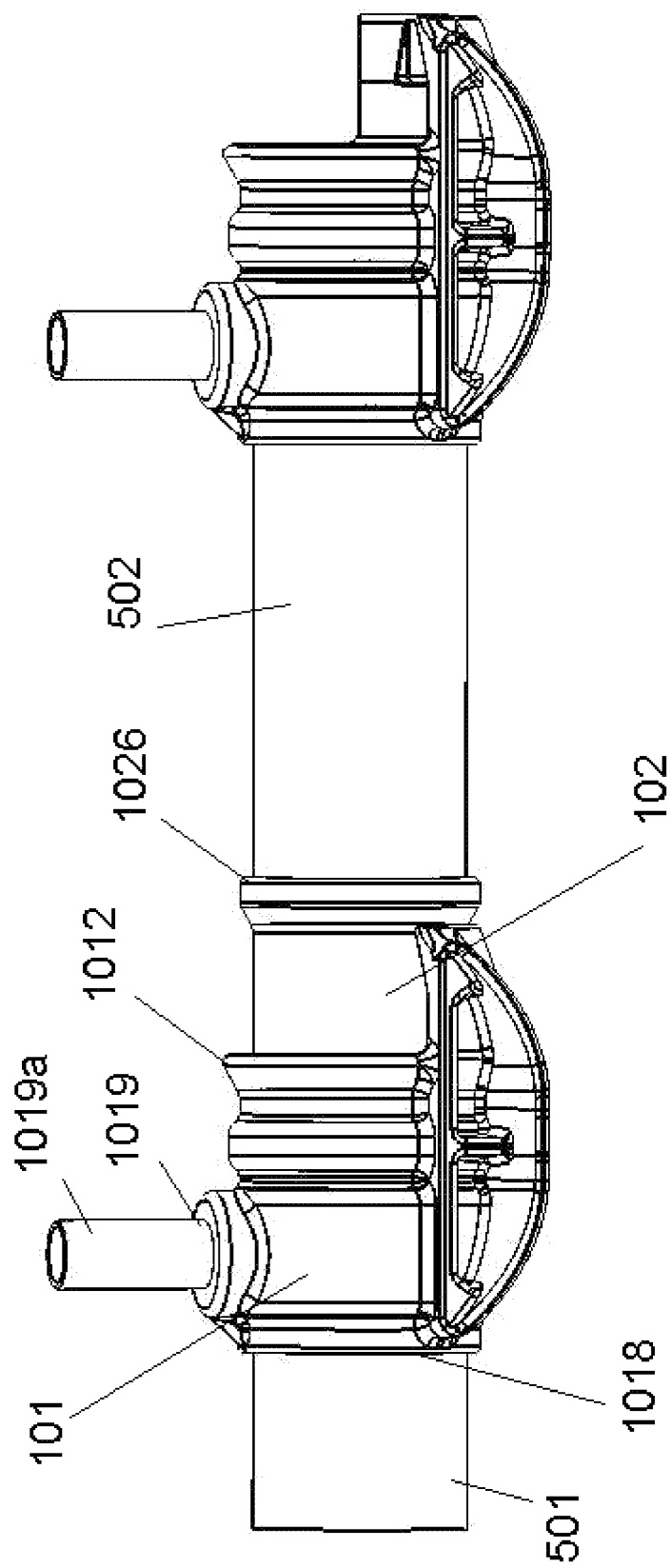
FIG. 5C shows a side elevation view of a male coupling and a female coupling according to an embodiment of the present invention.
Figure 5D:
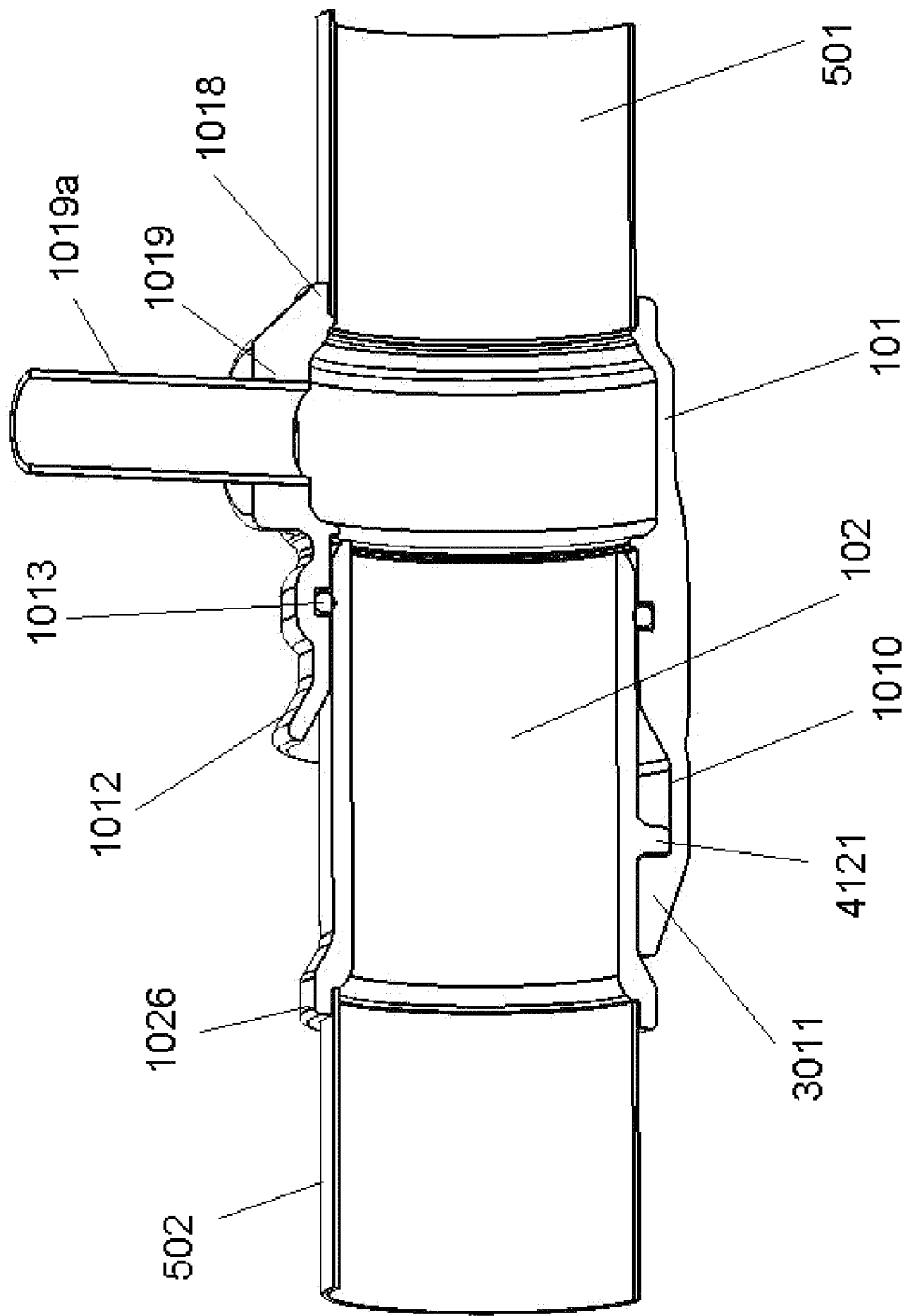
FIG. 5D a side cross-sectional view of a male coupling and a female coupling engaged according to an embodiment of the present invention.

As shown in FIG. 5A-5C, the distal end 1025 of the male coupling 102 may be coaxially inserted into the receiver 1012 of the female coupling 101. Such coaxial insertion may include (1) aligning the distal end 1025 of the male coupling 102 with the receiver 1012 in a substantially coaxial manner without any significant obliqueness in the relative orientation of the male and female couplings (see FIG. 5A), (2) advancing the distal end 1025 of the male coupling 102 into the receiver 1012 of the female coupling until the fastener 4121 is aligned with the fastener 3011 (see FIG. 5B), and (3) rotating the male coupling 102 (or alternatively the female coupling 101) through an arc length that brings the fastener 4121 fully into interfacial alignment with the fastener 3011 so that the fastener 4121 is rests against fastener 3011 and will not be dislodged by axial tension on the pipes 501 and 502 (see FIG. 5C). FIG. 5D provides a cross-sectional view of the male coupling 102 and female coupling 101 fully engaged with the fasteners 3011 and 4121 in interfacial engagement and a watertight seal provided between distal end 1025 of the male coupling 102 and the gasket 1013. Several conduit lengths may be connected to one another end-to-end using the male and female couplings disclosed herein to build long chains of conduit (e.g., irrigation draglines) that are capable of being moved (e.g., dragged) along the ground without separation at the male-female couplings.

It is to be understood that variations, modifications, and permutations of embodiments of the present invention, and uses thereof, may be made without departing from the scope of the invention. It is also to be understood that the present invention is not limited by the specific embodiments, descriptions, or illustrations or combinations of either components or steps disclosed herein. The embodiments were chosen and described in order to best explain the principles of the invention and its practical application, to thereby enable others skilled in the art to best utilize the invention and various embodiments with various modifications as are suited to the particular use contemplated. Although reference has been made to the accompanying figures, it is to be appreciated that these figures are exemplary and are not meant to limit the scope of the invention. It is intended that the scope of the invention be defined by the claims appended hereto and their equivalents.

What is claimed:

1. A towable conduit coupling system operable for reversibly mechanically linking above-ground irrigation conduits, comprising:
   a. a plurality of irrigation pipes, each of said irrigation pipes including:
      i. a male coupling having
         1. A first fastener on an outer surface of a first coupling end, and
         2. An insertion portion; and
      ii. a female coupling, having a receiver for receiving a male coupling of a second pipe of said plurality of pipes and a cradle with an open upper aspect and a second fastener therein operable to be reversibly mechanically engaged with said first fastener, wherein said insertion portion can be inserted into said receiver axially without said first and second fasteners obstructing the insertion of said first insertion portion and said first and second fasteners can be engaged by rotation of one or both of said male coupling and said female coupling in either rotational direction after said insertion end is inserted into said receiver, wherein said male coupling and said female coupling have no structures that impede rotational engagement or disengagement of said first and second fasteners, wherein said first fastener comprises a partial flange on the outer surface of said male coupling and said second fastener comprises a partial flange on an interior surface of said female coupling.

2. The system of claim 1, further comprising at least one O-ring gasket in said receiver for providing a fluid tight seal between said first and second coupling ends.

3. The system of claim 1, wherein said male coupling and female coupling are mechanically connected by said first and second fasteners, with no additional fasteners.

4. A towable conduit coupling system operable for reversibly mechanically linking above-ground irrigation conduits, comprising:
   a. a plurality of irrigation pipes, each of said irrigation pipes including:
      i. a male coupling having
         1. A first fastener on an outer surface of a first coupling end, and
         2. An insertion portion; and
      ii. a female coupling, having a receiver for receiving a male coupling of a second pipe of said plurality of pipes and a cradle with an open upper aspect and a second fastener therein operable to be reversibly mechanically engaged with said first fastener, wherein said insertion portion can be inserted into said receiver axially without said first and second fasteners obstructing the insertion of said first insertion portion and said first and second fasteners can be engaged by rotation of one or both of said male coupling and said female coupling in either rotational direction after said insertion end is inserted into said receiver, wherein said male coupling and said female coupling have no structures that impede rotational engagement or disengagement of said first and second fasteners, wherein said receiver has a complete circumference into which the insertion portion may be inserted and said cradle has an incomplete circumference and said second fastening structure is located on an internal surface of said cradle, and said second fastener comprises a wedge-shaped structure having a substantially triangular cross-section on an interior surface of said female coupling.

* * * * *